Nov. 27, 1923.
I. TROLLEY
1,475,204
TRACTOR CONNECTION FOR AGRICULTURAL IMPLEMENTS
Filed Dec. 26, 1918
3 Sheets-Sheet 2
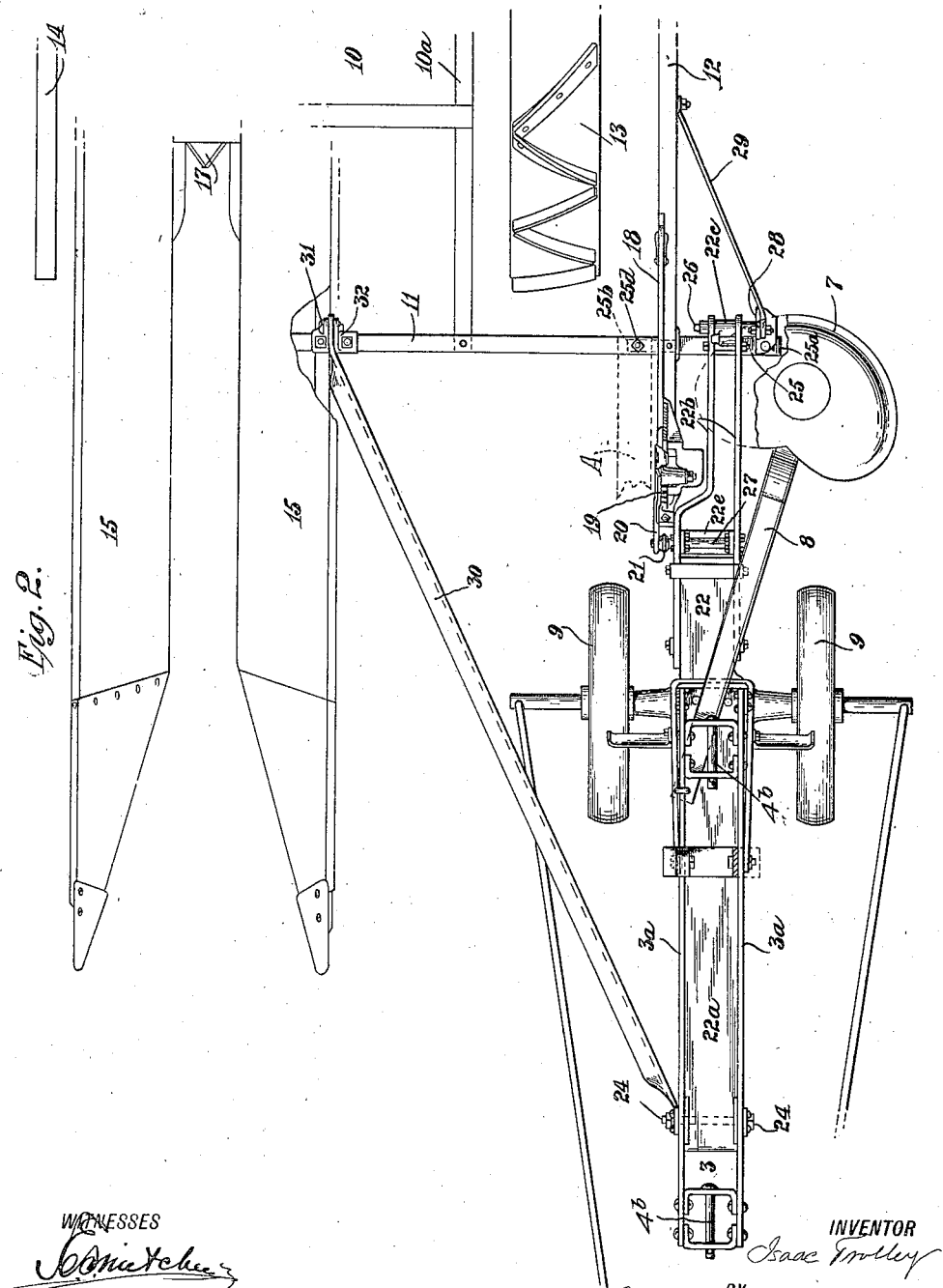

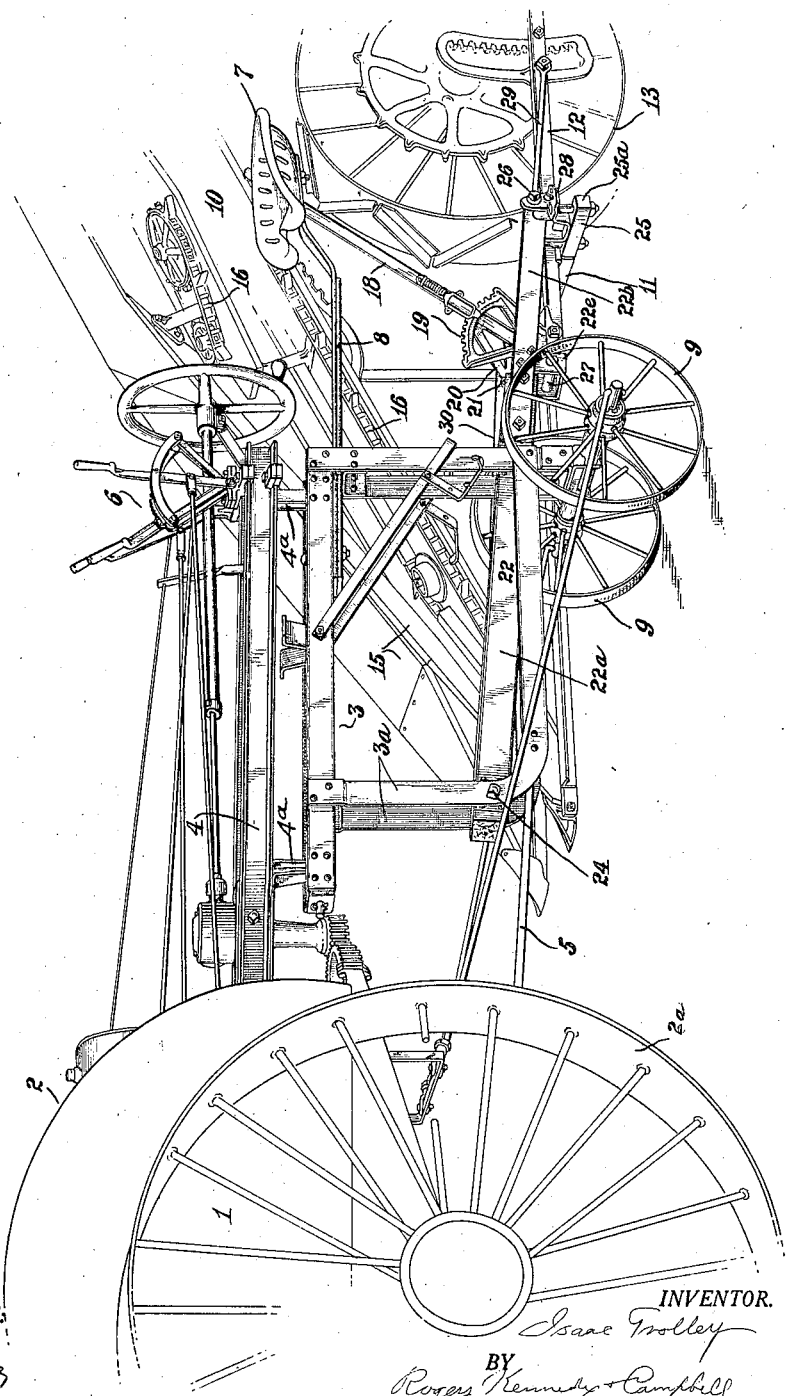

Nov. 27, 1923.                                              1,475,204
                        I. TROLLEY
        TRACTOR CONNECTION FOR AGRICULTURAL IMPLEMENTS
               Filed Dec. 26, 1918        3 Sheets-Sheet 3
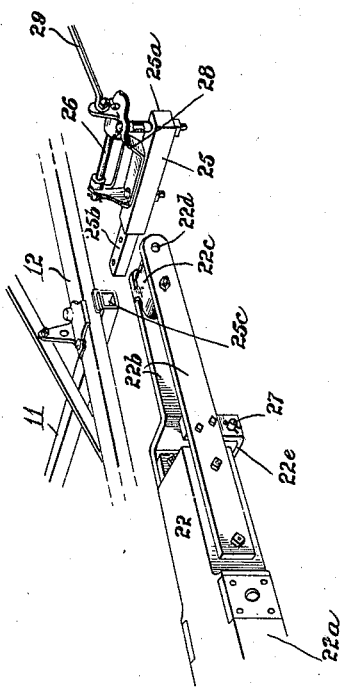
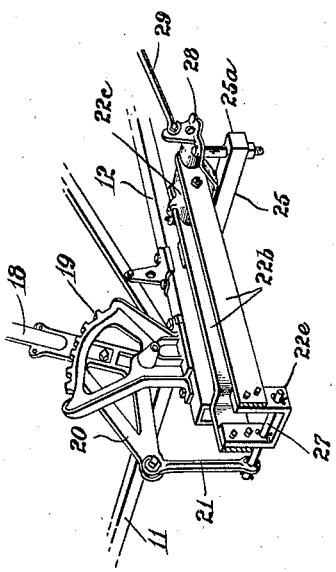
WITNESSES
INVENTOR
BY
ATTORNEYS Patented Nov. 27, 1923.

1,475,204

UNITED STATES PATENT OFFICE.

ISAAC TROLLEY, OF POUGHKEEPSIE, NEW YORK, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR CONNECTION FOR AGRICULTURAL IMPLEMENTS.

Application filed December 26, 1918. Serial No. 268,387.

*To all whom it may concern:*

Be it known that I, ISAAC TROLLEY, a citizen of the United States, residing at Poughkeepsie, in the county of Dutchess and State of New York, have invented certain new and useful Improvements in Tractor Connections for Agricultural Implements, of which the following is a specification, reference being had therein to the accompanying drawing.

This invention relates to means for connecting agricultural implements to tractors, so that the implement will trail behind the tractor in the passage of the latter through the field; and more particularly the invention has reference to the connection of corn harvesters and binders to tractors, the objects of the invention being to admit of a relative vertical movement between the tractor and harvester in passing over uneven ground, and in preventing the weight or down-drag of the tractor from being imposed on the harvester; to enable the harvester to be tilted or adjusted relatively to the tractor to vary the height of the gathering boards and cutting device, and to provide for the speedy and convenient attachment and detachment of the harvester and tractor. These and other objects and advantages I accomplish by the improved construction and arrangement of the parts particularly described in the specification to follow, and claimed in the appended claims.

In the accompanying drawings:

Fig. 1 is a perspective view of so much of a tractor and corn harvester and binder as will be necessary for an understanding of my invention, the two being connected in accordance with my invention.

Fig. 2 is a top plan view with certain parts removed.

Fig. 3 is a perspective view of the rear end of the draft device by which the tractor is connected to the harvester frame, and the extension of said frame to which the draft device is adapted to be pivoted, the said parts being shown separated from each other.

Fig. 4 is a fragmentary perspective view of the rear portion of the draft device connected to the harvester frame, and showing the hand lever for adjusting the parts to vary the height of the gathering boards and cutting device of the harvester.

Referring to the drawings:

1 designates a tractor consisting of a power unit 2 sustained by two power driven traction wheels, one only of which, $2^a$, is shown, and a supporting truck 3 which is arranged in rear of the power unit and beneath a horizontal beam 4 extending rearwardly from the power unit, by which means the equilibrium of the power unit is preserved. The draft of the power unit is applied to the supporting truck by means of a draft link 5 pivoted at its forward end to the power unit and pivoted at its rear end to the truck; and the control of the power unit is effected by means of controlling devices 6, sustained by the beam 4 and operated by the driver occupying a seat 7 on the rear end of a seat bar 8 sustained at its forward end by the truck.

The truck 3 comprises an upright rectangular frame consisting of rectangular side frames $3^a$ spaced from each other and connected together in fixed relations to form a unitary structure, the rear end of this frame being sustained by a pair of truck wheels 9. The upper portion of this frame gives support to the beam 4 of the power unit, through the medium of two arms $4^a$—$4^a$ depending from the beam and mounted loosely at their lower ends on horizontal longitudinal pins or rods $4^b$—$4^b$ fixedly sustained by the frame, by which construction the truck frame and beam are permitted limited relative movements in a fore and aft direction, and also a relative rocking or tipping movement about the axes of the rods.

10 designates a corn harvester and binder comprising a sustaining frame $10^a$ having a forward horizontal frame bar 11 from which a side frame bar 12 extends rearwardly at the stubble side, which frame is sustained at the stubble side by a stubble wheel 13 and at the grain side by a grain wheel 14, two gathering boards 15 being mounted on the sustaining frame and extending forwardly from the grain side thereof a considerable distance in advance of the front frame bar 11. The gathering boards are equipped, as usual, with gathering chains 16 which draw the stalks in between the boards and present them to a cutting device 17 (see Fig. 2) as the machine advances through the field. The foregoing parts may be and are of the usual, ordinary and well known construction, and except in so far as hereinafter indicated, they form no part of the present invention.

When the harvester is drawn through the field by draft animals, as heretofore, a draft tongue A, shown by dotted lines in Fig. 2, is provided, which is pivoted at its rear end to the front frame bar 11, the variation of the height of the ends of the gathering boards and the cutting device being effected by an adjusting hand lever 18 pivoted at its lower end to a toothed segment frame 19 fixed to the forward end of the frame bar 12. This lever is provided on its lower end with an arm 20 having jointed to it a link 21, which, when the draft tongue A is used, is pivoted to the tongue, so that by swinging the lever forwardly or backwardly and locking it to the segment frame, the harvester frame may be tilted on the axis of its sustaining wheels, and the gathering boards and cutting device raised or lowered as the case may be.

In connecting the tractor to the harvester in accordance with my invention, the two machines are placed relatively to each other, as shown in Fig. 2, where it will be seen that the wheels of the truck will travel at the stubble side of the inner gathering board some distance in rear of its forward end, and generally in line with the frame bar 12 of the harvester, it being understood that the draft tongue A before alluded to is first removed from the harvester after disconnecting the link 21 from the tongue. In place of this tongue, a draft device 22 is provided for connecting the tractor with the harvester, which draft device extends at its forward portion between the spaced side frames 3ª of the truck frame, and is pivoted thereto by means of a horizontal pivot bolt 24, and has its rear end pivoted to an extension 25 of the frame bar 11 of the harvester frame, by means of a pivot bolt 26, the link 21 being pivoted at its lower end to a horizontal pin 27 sustained by the draft device. In its preferred form, the draft device consists of a forward portion in the form of a beam 22ª, and a rear portion in the form of two straps or arms 22ᵇ fixed firmly to the beam on opposite sides of the same, and connected together in spaced relations by means of a casting or block 22ᶜ, which contains a horizontal opening 22ᵈ to receive the pivot bolt 26, a bracket or hanger 22ᵉ being bolted to the arms adjacent the rear end of the beam and giving support to the pivot pin 27. The extension 25 of the front frame bar 11 of the harvester is in the form of a bar 25ª having a reduced squared end 25ᵇ adapted to seat in a squared socket or hole 25ᶜ in the outer end of the frame bar 11, and secured therein by bolts 25ᵈ, the bar when thus fastened in place constituting in effect an extension or continuation of the frame bar 11, and projecting stubbleward beyond the side frame bar 12. The pivot bolt 26 to which the rear end of the draft device is connected, is sustained by a casting or bracket 28, which is bolted to the upper side of the extension bar 25, the bracket being braced in place on the harvester frame by means of a brace rod 29 connected at its forward end to the outer end of the bracket and connected at its rear end to the side of the frame bar 12.

A draft bar 30 is pivoted at its forward end on the pivot bolt 24, whence it extends rearwardly at an inclination toward the gathering boards, and has its rear end pivoted by means of a horizontal transverse pivot bolt 31, to a bracket 32 fixed to the frame bar 11, the axes of the pivot bolts 31 and 26 being in transverse alignment with each other.

As a result of the construction described, as the harvester is drawn by the tractor through the field, the two are capable of a vertical relative movement in passing over unevenness in the surface of the ground, the draft device in such movements rocking on the pivot bolt 24. The tractor may thus move up and down on its pivot bolt relatively to the harvester, and the harvester may move up and down relatively to the tractor, carrying with it the draft device which is locked thereto by the adjusting hand lever. Also by means of the adjusting hand lever, the frame of the harvester may be tilted or rocked on the axes of its sustaining wheels 13 and 14 to raise and lower the gathering boards and cutting device. As a result of this arrangement and action of the parts, the tractor and harvester may adjust themselves independently to the unevenness in the surface of the ground, and the weight or down-drag of the tractor will be prevented from being imposed on the harvester; the driver occupying the driver's seat being in position to control the tractor and to adjust the harvester relatively thereto to vary the height of the gathering boards and cutting device, according to the conditions encountered in practice.

The seat bar extends at an inclination towards the stubble so that the seat will be supported free of interference with the adjusting hand lever, as shown in Fig. 2.

It will be understood that the pivot bolts 26 and 31 are removable from their sustaining brackets in order to permit the rear ends of the draft device and draft bar to be detached when the tractor is disconnected, in which operation the link 21 will be detached from the pin 27.

In the foregoing description and accompanying drawings, I have set forth my invention in the particular detailed form which I prefer to adopt and which in practice has been found to answer to a satisfactory degree the ends to be attained. It will be understood, however, that these details may be variously changed and modified by the skilled mechanic without departing from the limits of the invention; and further, it will be understood that the invention is not limited to any particular form or construction of the parts, except in so far as such limitations are specified in the claims.

Having thus described my invention, what I claim and desire to secure by Letters Patent of the United States, is, as follows:

1. The combination with a two wheel tractor of the unstable type, of a stabilizing truck, a corn harvester having portions thereof extending to one side of the stabilizing truck, draft connections between the truck and harvester, and mechanism associated with the harvester and draft connections for tilting the harvester about a horizontal axis.

2. The combination with a two wheel tractor of the unstable type, of a stabilizing truck, a corn harvester, mechanism associated with the harvester for tilting it about a horizontal axis, and draft connections between the truck and harvester permitting the harvester to move relative to the truck about a substantially transverse, horizontal axis in all adjusted positions of the harvester.

3. The combination with a two wheel tractor of the unstable type, of a stabilizing truck connected thereto so that it may tilt about a substantially longitudinal, horizontal axis relative to the tractor, a corn harvester, mechanism for tilting the harvester about a horizontal axis, and draft connections between the corn harvester and truck permitting the harvester to move relative to the truck about a substantially transverse, horizontal axis in all adjusted positions of the harvester.

4. The combination with a two wheel tractor of the unstable type, of a stabilizing truck, a corn harvester, a draft tongue pivoted to the corn harvester and to the stabilizing truck near the forward portion of said truck, and mechanism associated with the harvester and the draft tongue for adjusting the harvester relative to the tongue to tilt it about a horizontal axis.

5. The combination with a two wheel tractor having a steering frame, of a stabilizing truck connected to the steering frame, said frame and truck being arranged so that the truck may tilt relative to the tractor about a substantially longitudinal, horizontal axis, a corn harvester, mechanism for tilting the harvester about a horizontal axis, and draft connections between the corn harvester and truck permitting the harvester to move relative to the truck about a substantially transverse, horizontal axis in all adjusted positions of the harvester.

6. The combination with a two wheel tractor of the unstable type, of a stabilizing truck, a corn harvester, draft connections between the truck and harvester, a member on the harvester to which a draft tongue may be connected for drawing the harvester by horses, and mechanism associated with the harvester and tractor draft connections for tilting the harvester about a horizontal axis, said mechanism being located so that when the harvester is used with horses, it may be readily connected to the draft tongue to tilt the harvester about a horizontal axis.

7. In combination with a harvesting machine having a frame provided with a front frame bar and having ground wheels sustaining the frame, a tractor traveling in front of the frame, an extension bar detachably connected with the stubble end of the front frame bar and extending stubbleward of the ground wheel at that side, a draft device connected at its front end to the tractor and pivoted at its rear end to the extension bar, and means for adjusting the draft device and harvester frame vertically relatively to each other.

8. In combination with a harvesting machine having a frame provided with a front transverse frame bar and provided also with a side frame bar extending rearwardly therefrom, a grain wheel sustaining the grain side of the frame, a stubble wheel sustaining the frame at a point inward of said rearwardly extending frame bar, an extension bar detachably connected with the stubble end of the front frame bar and extending stubbleward of the side bar, a tractor, a draft device connected at its front to the tractor and pivoted at its rear to the extension bar, and means for adjusting the draft device and harvester frame vertically relatively to each other.

9. In combination with a harvesting machine having a frame provided with a transverse front frame bar, a side frame bar extending rearwardly therefrom, divider boards extending forwardly of the front frame bar at one side, and ground wheels supporting the frame, an extension on the front frame bar projecting laterally therefrom, a tractor consisting of a power unit and a connected truck supporting the rear portion of the same, a draft device pivoted at its forward end to the truck and pivoted at its rear end to said extension, a draft bar pivoted at its forward end on the axis connecting the draft device with the truck, and pivoted at its rear end to the front frame bar on an axis in transverse alignment with the pivotal connection of the draft device with the extension, and a lever on the harvester frame operatively connected with the draft device for adjusting the same.

10. In combination with a harvesting machine having a frame provided with a transverse front frame bar and with a rearwardly extending side frame bar, a stubble wheel on the harvester frame at the inner side of the side frame bar, divider boards extending forwardly of the front frame bar, an extension on the front frame bar extending stubbleward of the stubble wheel, a tractor comprising a power unit and a connected supporting truck, a draft device pivoted at its forward end to the truck and at its rear end to said extension, a lever on said side frame bar, means for locking said lever in different relations to said harvester frame, and connections between the lever and draft device for adjusting the latter.

11. In combination with a harvesting machine having a frame, and divider boards extending forwardly thereof at one side, a tractor comprising a power unit and a connected supporting truck, a draft device connecting the truck with the harvester frame, an adjusting lever on the harvester frame operatively connected with the draft device, and a seat supporting bar sustained by the supporting truck and extending rearwardly stubbleward therefrom to sustain the seat free of interference with the adjusting lever.

In testimony whereof, I have affixed my signature hereto.

ISAAC TROLLEY.